US012698661B2

(12) United States Patent
Patje et al.

(10) Patent No.: US 12,698,661 B2
(45) Date of Patent: Aug. 4, 2026

(54) PIVOT HINGE AND PIVOTAL DOOR LEAF

(71) Applicant: FRITSJURGENS HOLDING B.V., Kolham (NL)

(72) Inventors: Alexander Patje, Kolham (NL); Igor Twellaar, Kolham (NL); Hilde Seip, Kolham (NL); Martin Erwin Mulder, Kolham (NL); Durk Rovers, Kolham (NL)

(73) Assignee: FRITSJURGENS HOLDING B.V., Kolham (NL)

( * ) Notice: Subject to any disclaimer, the term of this patent is extended or adjusted under 35 U.S.C. 154(b) by 0 days.

(21) Appl. No.: 18/856,893

(22) PCT Filed: Apr. 19, 2023

(86) PCT No.: PCT/EP2023/060109
§ 371 (c)(1),
(2) Date: Oct. 15, 2024

(87) PCT Pub. No.: WO2023/213541
PCT Pub. Date: Nov. 9, 2023

(65) Prior Publication Data

US 2025/0263961 A1 Aug. 21, 2025

(30) Foreign Application Priority Data

May 2, 2022 (EP) ..................................... 22171124

(51) Int. Cl.
*E05D 7/08* (2006.01)
*E05D 7/081* (2006.01)
*E05D 11/10* (2006.01)

(52) U.S. Cl.
CPC .......... *E05D 11/1064* (2013.01); *E05D 7/081* (2013.01)

(58) Field of Classification Search
CPC ..... E05F 3/104; E05F 3/10; E05F 3/20; E05F 3/22; E05F 3/225; E05F 3/227;
(Continued)

(56) References Cited

U.S. PATENT DOCUMENTS 3,174,177 A * 3/1965 Bugge ..................... E05F 3/104 16/60
3,474,485 A 10/1969 Mittig et al.
(Continued)

FOREIGN PATENT DOCUMENTS

DE 4041824 C1 * 6/1992 .............. E05F 3/104
DE 10 2010 022047 A1 6/2011
EP 4571031 A1 * 6/2025 ................ E05F 3/12

OTHER PUBLICATIONS

International Search Report and Written Opinion for WO 22023/213541 (PCT/EP2023/060109), dated Jul. 14, 2023, pp. 1-9.
EP Search Report for 22171124.5, dated Oct. 19, 2022, pp. 1-8.

*Primary Examiner* — Chuck Y Mah
(74) *Attorney, Agent, or Firm* — Thomas|Horstemeyer, LLP

(57) ABSTRACT

A pivot hinge has a pivot pin member for pivotally connecting a pivotal door leaf with a structural element. The hinge comprising a first cam follower on a first side of the pivot pin member and a second cam follower on a second side of the pivot pin member opposite the first side, the first and second cam followers both being movable in a radial direction relative to the cam. A slidable reciprocating member is arranged within the casing and has first and second end parts rigidly connected to one another. The cam has a pair of recesses. The spring arrangement is arranged between the second cam follower and the second end part and urges both first and second cam followers against the cam and into the
(Continued)

respective recess to provide a holding moment to retain the door leaf in a holding position.

20 Claims, 6 Drawing Sheets

(58) Field of Classification Search
CPC ......... E05Y 2201/456; E05Y 2201/706; E05Y 2201/638; E05Y 2800/268; E05Y 2900/132; E05Y 2600/452; E05Y 2600/41; E05D 7/086; E05D 7/10; E05D 7/105; E05D 11/1064; E05D 11/1028; E05D 11/105
See application file for complete search history.

(56) References Cited

U.S. PATENT DOCUMENTS

| | | | | | |
|---|---|---|---|---|---|
| 4,785,493 | A * | 11/1988 | Tillmann | E05F 3/104 | 16/56 |
| 5,901,412 | A * | 5/1999 | Jentsch | E05F 3/104 | 16/60 |
| 2006/0123598 | A1 * | 6/2006 | Park | E05F 3/225 | 16/378 |
| 2011/0197391 | A1 * | 8/2011 | Yu | E05F 3/104 | 16/49 |
| 2020/0224478 | A1 * | 7/2020 | Salutzki | E05F 11/54 | |

* cited by examiner

Fig. 3
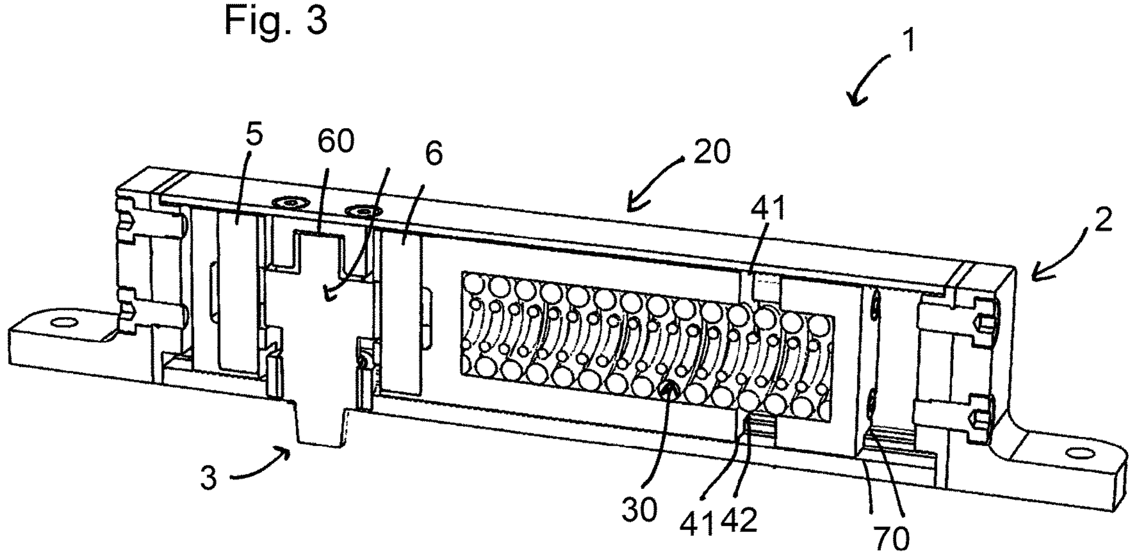
Fig. 4a
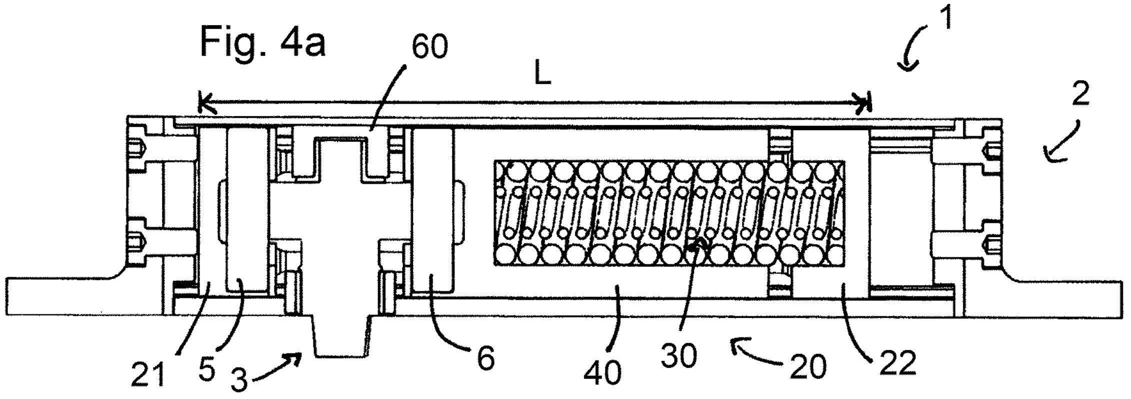
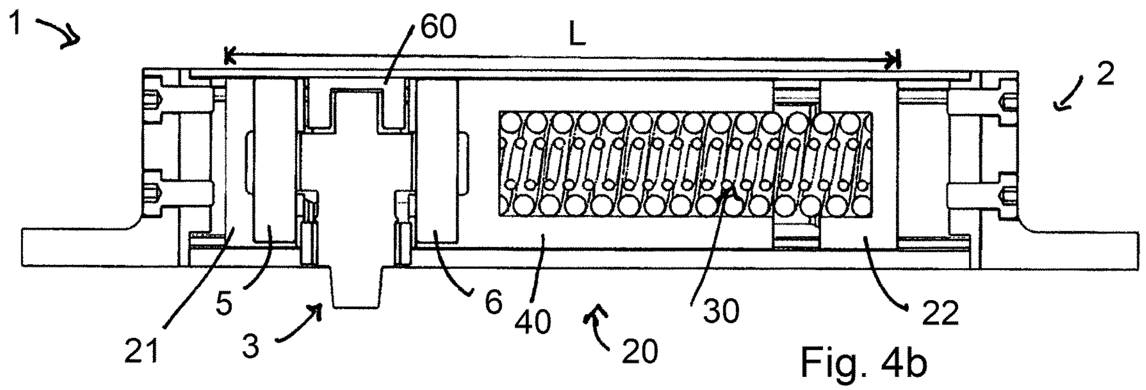
Fig. 4b

Fig. 5
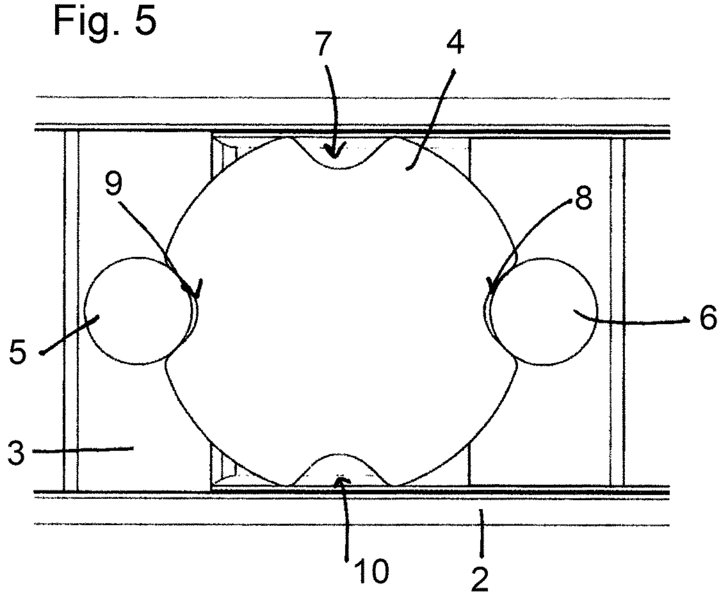
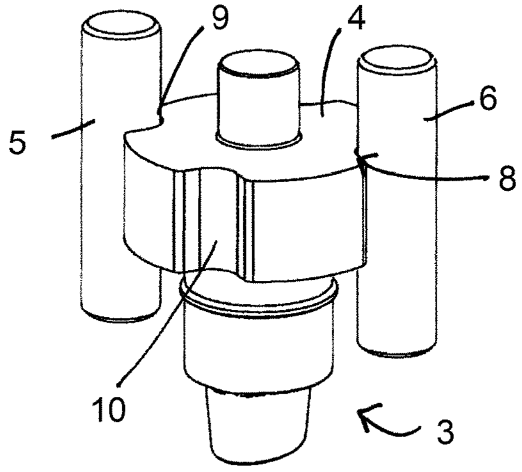
Fig. 6

PIVOT HINGE AND PIVOTAL DOOR LEAF

CROSS-REFERENCE TO RELATED APPLICATIONS

This application is the National Stage of International Application No. PCT/EP2023/060109, filed Apr. 19, 2023, which claims priority to EP 22171124.5, filed May 2, 2022, all of which are entirely incorporated herein by reference.

FIELD OF THE INVENTION

The invention relates to the field of pivot hinges having a pivot pin member for pivotally connecting a pivotal door leaf with a structural element, e.g. a floor or a ceiling of a building or a door frame mounted in or on a floor or ceiling of a building, the door leaf having an upper edge, lower edge, an inner side edge, and an outer side edge, and the pivot pin member defining a vertical pivot axis for the door leaf, wherein the pivot pin member has a cam, the pivot hinge comprising a first cam follower on a first side of the pivot pin member and a second cam follower on a second side of the pivot pin member opposite the first side. The pivot hinge comprising a spring arrangement adapted to urge a cam follower against the cam.

These pivot hinges are typically mounted to a pivot door. To install the pivot door the pivot pin member is typically coupled with a suitable opening in the structural element, e.g. ceiling or floor or door frame. For example, the pivot pin member could extend from the lower or upper edge of the pivot door. The opening could, for example, be provided in the structural element itself, or in a dedicated mounting plate that is to be fixed to the structural element. Alternatively, the pivot hinge can be mounted to the structural element, e.g. floor, ceiling, or a door frame provided therein or thereon.

The pivot pin member and the opening typically engage such that the pivot pin member has a fixed position relative to the opening, and the pivot door has a fixed position relative to the structural element, e.g. ceiling and/or floor or door frame, apart from rotation around a vertical pivot axis as defined by the pivot pin member. In other words, by using a pivot hinge the pivot door can rotate around the vertical pivot axis and as such can swing between open and closed positions. In doing so, the cam followers then rotate relative to the cam of the pivot pin member.

The cam of the pivot pin member commonly has a shape that is such that in rotating the pivot door- and hence the cam followers-relative to the pivot pin member, the diameter of the cam as seen between the first and second cam followers varies. This means that for one or both of the cam followers the radial position relative to the cam varies in said rotation.

BACKGROUND OF THE INVENTION

An example of a pivot hinge is disclosed in U.S. Pat. No. 3,474,485. The pivot hinge disclosed in this document has a heart shaped cam with a contour having an apex where two convex surface adjoin one another and a recess opposite the apex, which recess is defined by a concave surface of the cam. A first cam follower is arranged in the casing at a first side of the pivot pin member and is urged by a corresponding first spring against the cam, which first spring is mounted between a first end of the casing and the first cam follower. A second cam follower is arranged in the casing at the second side of the pivot pin member, opposite the first side, and is urged by a set of concentric second springs against the cam. The set of second springs is mounted between a second end of the casing and the second cam follower. In a holding position of the door leaf, the set of second springs urge the second cam follower into the recess of the cam to provide the holding moment that retains the door leaf in the holding position. The known pivot hinge is provided with hydraulic damping as the cam followers are each mounted on a respective piston that divide the internal space of the casing into three chambers. Hydraulic oil is filled into each of the chambers and can pass between the chambers trough passages and channels so as to provide a damping action to slow down motion of the door leaf.

Another prior art pivot hinge is disclosed in DE102010022047. The pivot hinge disclosed in this document has a heart shaped cam with a contour having an apex where two convex surface adjoin one another and a recess opposite the apex, which recess is defined by a concave surface of the cam. A first cam follower is arranged on a corresponding piston in the casing at a first side of the pivot pin member and is urged by a corresponding first spring against the cam, which first spring is mounted between a first end of the casing and the piston provided with the first cam follower. A second cam follower is arranged on a corresponding piston in the casing at the second side of the pivot pin member, opposite the first side. The pistons are connected to one another via tension rods which are secured at one end thereof to one of the pistons and are at the other end thereof axially movable relative to the other piston. So-called play compensating springs on the tension rods are configured to keep the cam followers in contact with the cam without play, yet do not provide the holding moment of this known pivot hinge. The holding moment is provided by a spring arrangement mounted between the second cam follower and the casing.

OBJECT OF THE INVENTION

It is an object of the invention to provide an alternative pivot hinge. It is a further object of the invention to provide a compact pivot hinge. It is a further object of the invention to provide a pivot hinge with an improved holding moment. It is a further object of the invention to provide a pivot hinge with an improved durability.

SUMMARY OF THE INVENTION

One or more of these objects are achieved by a pivot hinge according to claim 1.

The pivot hinge having the slidable reciprocating member allows for a compact pivot hinge. The spring arrangement is located on the second side of the pivot pin member. The spring arrangement which is mounted between the second end part of the slidable reciprocating member and the second cam follower urges both the first and the second cam followers against the cam as the force exerted by the spring arrangement on the second end part is transferred by the rigid connection to the first end part of the slidable reciprocating member, which first end part is coupled with the first cam follower. This is advantageous, e.g. as it allows for the vertical pivot axis to be located close to the edge of door, whilst still being able to provide a powerful and/or elongate spring arrangement. That is, the distance between the edge of the door leaf and the pivot axis does not rely on the size of the spring arrangement.

A further advantage is that due to the rigid connection between the first and second end parts of the slidable reciprocating member, the force acting on the second end part equals the force acting on the first end part and the forces exerted by the first and second cam followers on the cam are equal yet opposite in direction. This leads to a balanced pivot hinge. For example, the cam and thus the pivot pin member is not subject to an effective unidirectional radial force, e.g. putting a permanent load on a mounting of the pivot pin member in the casing. Such an undesirable situation is present in the pivot hinges of U.S. Pat. No. 3,474,485 and DE102010022047.

The spring arrangement is, or may be, arranged under pretension, e.g. an adjustable pre-tension.

The pivotal door leaf may be a large and heavy door, e.g. a glass door. The pivotal door leaf may have an outer profile. In an embodiment thereof, the casing may be integrated in, or be part of, said outer profile.

The cam has recesses configured to receive both of the cam followers to form at least one holding position for the door leaf, e.g. an opened and/or closed position of the door leaf, or one or more positions therebetween. That is, in rotating the door leaf around the pivot pin member, the cam followers are urged into the recesses by the spring arrangement as they follow and rotate along the contour of the cam. This leads to a holding moment to retain the door leaf in said position. Seen between the first and second cam followers, the recesses essentially lead to the cam locally having a reduced diameter, i.e. an inner diameter that is smaller than an outer diameter of the cam.

A pair of recesses is provided such that both cam followers are simultaneously retained in a corresponding recess. This provides for a significant holding moment governed by the action of the spring arrangement in conjunction with the slidable reciprocating member. Multiple pairs of recesses may e.g. be provided at right angles from each other, the one pair corresponding to the closed position of the door leaf and the other pair corresponding to the opened position of the door leaf.

In a further embodiment, the pivot hinge further comprises a slidable guide member that is movably mounted within the slidable reciprocating member, the slidable guide member being coupled with the second cam follower, and the spring arrangement being arranged between the slidable guide member and the second end part. The slidable guide member transfers the spring force to the second cam follower. As such the slidable guide member aids in the radial movement of the second cam follower relative to the pin member as the spring arrangement urges the second cam follower against the cam. Similarly, the slidable guide member aids in the radial movement of the second cam follower relative to the second end part when it compresses the spring arrangement.

The slidable guide member may further advantageously add stability to the spring arrangement and/or the compressing thereof by the second cam follower and/or the radial movement of the second cam follower due to the spring force. The slidable guide member may e.g. be made of a metal material such as steel, or a plastic material, for example polyoxymethylene (POM). A plastic material is advantageous for reducing friction in a sliding movement.

In a practical embodiment, the slidable guide member is elongate and has a bore in which the spring arrangement is received. This is, for example, advantageous for protecting the spring arrangement and/or providing further stability and stiffness to the spring arrangement so as to prevent undesired deformation thereof, e.g. out of plane deformation relative to the plane in which the spring arrangement is compressed/elongated.

In an embodiment, the slidable reciprocating member has sliding faces that are in sliding engagement with the casing. This sliding engagement may be a direct engagement between the slidable reciprocating member and the casing, or an intermediate guiding surface may be provided therebetween. The sliding faces may e.g. be provided in a lower part and/or an upper part of the slidable reciprocating member and be in sliding engagement with a lower and/or upper part of the casing. The sliding faces may be provided, e.g. additionally, on the first end part and/or second end part. The slidable reciprocating member may e.g. be made of a metal material such as steel, or a plastic material, for example POM. A plastic material is advantageous for reducing friction in a sliding movement.

To further facilitate the sliding movement of the slidable reciprocating member, the sliding faces of the slidable reciprocating member and/or the part that the respective sliding faces are in sliding engagement with, e.g. the lower and/or upper part of the casing, may be provided with friction reducing measures. These measures may e.g. relate to surface treatment of surfaces of the casing and/or the slidable reciprocating member, for example with a friction reducing coating. In particular, the surfaces that are in sliding engagement. For example, the material of which the slidable reciprocating member and/or the casing are made may be treated with material hardening and/or impregnation, e.g. with a co-polymer.

In yet another embodiment, the casing is provided with inner ribs to slidably support the slidable reciprocating member.

In a practical embodiment, the spring arrangement comprises a coil spring, for example two concentric coil springs or two parallel coil springs. Parallel coil springs may be arranged side-by-side, yet a concentric arrangement is preferred in view of compactness. The spring or springs, e.g. coil spring or coil springs, are chosen so as to fit the spring requirements, e.g. the stiffness, for the pivotal door leaf. Arranging multiple coil springs concentrically allows for using an appropriate combination of standard springs so as to meet said requirements without the need for designing a dedicated spring for the situation at hand.

In an embodiment, the slidable reciprocating member has one or more tension rods for rigidly connecting the first end part and the second end part. The first end part and second end part may e.g. be made of a metal material such as steel, or a plastic material, for example POM, and the tension rods may e.g. be made of steel, preferably stainless steel. The tension rods may form an outer contour for the slidable reciprocating member, or the tension rods may be received within the outer contour of the slidable reciprocating member. Furthermore, the tension rods may extend on an outer side of the cam, or the tension rods may be received in a recess in the cam.

In embodiments, the slidable guide member has sliding faces that are in sliding engagement with the tension rods and/or sliding faces that are in sliding engagement with the casing. This sliding engagement may be a direct engagement between the slidable guide member and the tension rods and/or the casing, or an intermediate guiding surface may be provided therebetween. These sliding faces may e.g. be provided in a lower part and/or an upper part of the slidable guide member and be in sliding engagement with a lower and/or upper part of the casing and/or the tension rods. The sliding faces of the slidable guide member that are in engagement with the casing may be aligned with the sliding faces of the slidable reciprocating member such that these faces may e.g. be supported by the same inner ribs of the casing.

To further facilitate the sliding movement of the slidable guide member, the sliding faces of the slidable guide member and/or the part that the respective sliding faces are in sliding engagement with, e.g. the lower and/or upper part of the casing, may be provided with friction reducing measures. These measures may e.g. relate to surface treatment of surfaces of the casing and/or the slidable guide member, for example with a friction reducing coating. In particular, the surfaces that are in sliding engagement. For example, the material of which the slidable guide member and/or the casing are made may be treated with material hardening and/or impregnation, e.g. with a co-polymer.

In a further embodiment, the cam followers are cam wheels. That is, the cam wheels rotate about their own vertical body axes as a result of their engagement with the cam in rotation around the vertical pivot axis. This for example reduces wear due to friction between the cam followers and the cam. The cam wheels may e.g. be made of steel, preferably stainless steel and the cam may e.g. be made of steel. The cam wheels may be provided with bearings. Alternatively, one or more of the cam followers are stationary pins that do not rotate about their own vertical body axes.

The cam may have sliding faces that are in sliding engagement with the casing. These sliding faces and/or the part of the casing that the respective sliding faces are in sliding engagement with may be provided with friction reducing measures as discussed previously, e.g. for the slidable guide member or the slidable reciprocating member.

The invention further relates to a pivotal door leaf provided with a pivot hinge as described herein.

In an embodiment, the pivot hinge is mounted to the lower edge of the door leaf, e.g. in a corner region between the inner side edge and the lower edge of the pivotal door leaf.

In a further embodiment, the pivot hinge is mounted such that the hinge extends along the lower edge of the pivotal door leaf and the first cam follower is located near the inner side edge of the door leaf. Due to the pivot hinge having the slidable reciprocating member that urges both cam followers against the cam, the vertical pivot axis as defined by the pivot pin member may then be located close to the inner side edge of the door, whilst the spring arrangement is located on the opposite side of the pivot pin member.

The invention further relates to a structural element and a pivotal door leaf connected to the structural element via a pivot hinge as described herein, wherein the casing is mounted to either the door leaf or to the structural element, for example at the lower edge of the door leaf or embedded in a floor below the lower edge of the door leaf.

The invention will be explained further with reference to the drawings, in which like reference symbols designate like parts.

BRIEF DESCRIPTION OF THE DRAWINGS

In these drawings:

FIG. 3 schematically shows a in perspective a cross-section of the pivot hinge of FIG. 1 along A-A.

FIGS. 4A-4B schematically show a cross-section of the pivot hinge of FIG. 1 along A-A in an outward radial state of the cam followers, and an inward radial state of the cam followers, respectively.

FIGS. 5 and 6 schematically shows the cam and cam followers for the pivot hinge of FIG. 1.

DETAILED DESCRIPTION OF EMBODIMENTS

Figure 1:
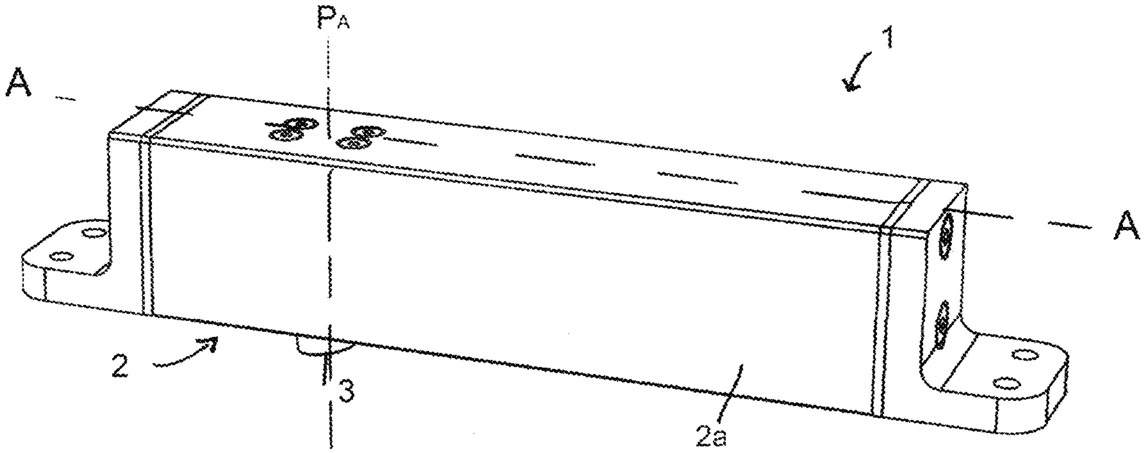
FIG. 1 schematically shows a view in perspective of a pivot hinge according to the invention.

In FIGS. 1-4B is shown a pivot hinge 1 having a pivot pin member 3 for pivotally connecting a pivotal door leaf with a structural element, the door leaf having an upper edge, lower edge, an inner side edge and an outer side edge, and the pivot pin member 3 defining a vertical pivot axis $P_A$ for the door leaf.

The pivot hinge 1 comprises a casing 2 configured to be mounted to either the door leaf or the structural element, for example to the lower edge of the door leaf, the pivot pin member 3 being configured to be fixed to the other of the door leaf or the structural element.

The pivot hinge 1 is suitable to be mounted to the lower edge of the door leaf, e.g. in a corner region between the inner side edge and the lower edge of the pivotal door leaf. For example, the pivot hinge may be mounted such that the hinge extends along the lower edge of the pivotal door leaf and the first cam follower 5 is located near the inner side edge of the door leaf.

The pivot pin member 3 can be seen in FIGS. 2-4B to have a cam 4.

The pivot pin member 3 is rotatable about a vertical pivot axis relative to the casing 2.

The pivot hinge 1 comprising a first cam follower 5 on a first side of the pivot pin member 3 and a second cam follower 6 on a second side of the pivot pin member 3 opposite the first side. The cam followers 5, 6, are both movable in a radial direction relative to the cam. The cam followers may be cam wheels.

The pivot hinge 1 comprises a spring arrangement 30 adapted to urge cam followers 5 and 6 against the cam 4.

The cam 4 has a first pair of recesses 8, 9 opposite one another as well as a second pair of recesses 7, 10. The pairs are perpendicular to one another.

The recesses 8,9 of the first pair are each configured to receive a respective one of the cam followers 5, 6 to form a first holding position for the door leaf, e.g. in opened and/or closed position of the door leaf. The recesses 7, 10 of the second pair cooperate with the cam followers 5, 6 to define a further holding position for the door leaf.

The pivot hinge 1 is shown to comprise a U-shaped mounting member 60 that is fixed to the casing 2 at the upper part 2$a$. In this mounting member 60 the pivot pin member 3 is rotatably received, at an upper end thereof, such that the pivot pin member retains its orientation relative to the casing 2 and is rotatable about the axis of the pivot pin member.

The pivot hinge 1 further comprises a slidable reciprocating member 20 which is arranged within the casing 2 and is movably mounted therein. The slidable reciprocating member 20 has a first end part 21 and a second end part 22 that are rigidly connected to one another. As such the slidable reciprocating member has a predetermined, fixed length L. The first end part 21 is coupled with the first cam follower 5, and the spring arrangement 30 is arranged between the second cam follower 6 and the second end part

22, such that the spring arrangement 30 urges both cam followers 5, 6 against the cam 4.

In FIG. 4A is shown an outward radial state of the cam followers 5, 6, that is the cam followers 5, 6 are urged outward by an outer local diameter of the cam 4 and the spring arrangement 30 is compressed by the second cam follower 6. Due to the rigid connection between the first end part 21 and the second end part 22, the outward radial movement of the first cam follower 5 leads to a sliding movement of the slidable reciprocating member 20, whilst the spring force of spring arrangement 30 is transferred from the second end part 22 to the first cam follower 5 so as to urge it against the cam 4. In FIG. 4B is shown an inward radial state of the cam followers 5, 6, in which the spring arrangement 30 urges the followers 5, 6 against the cam at an inner local diameter which is smaller than the outer local diameter of the position of the cam 4 of FIG. 4A.

Figure 2:
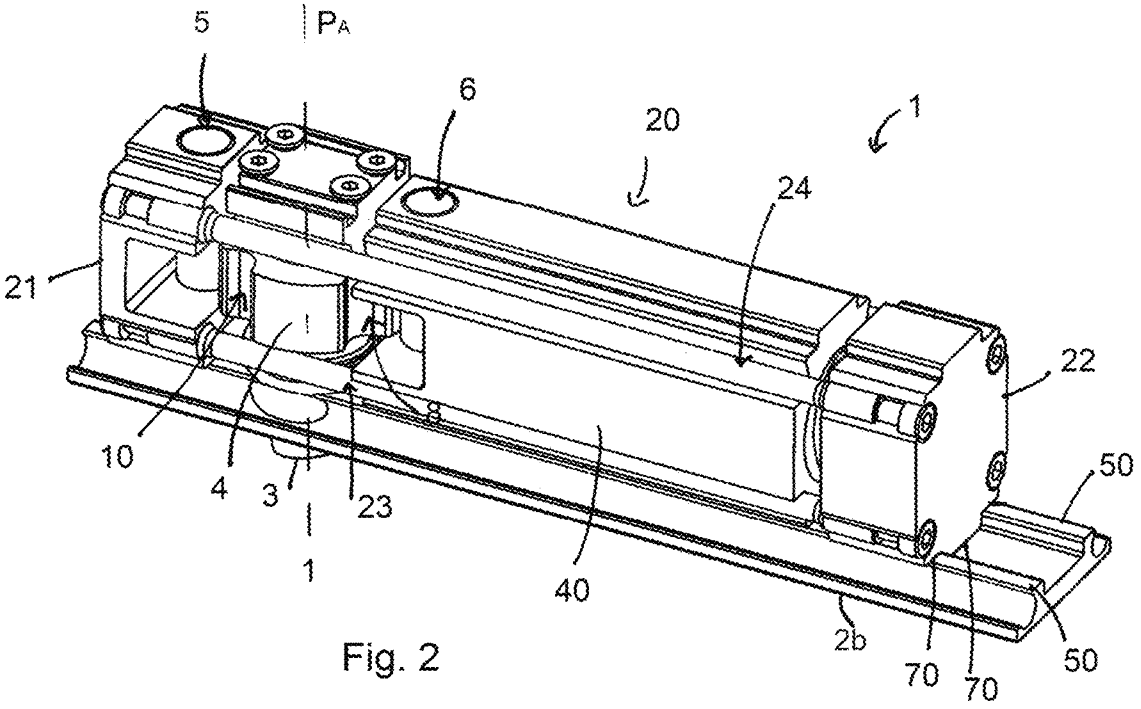
FIG. 2 schematically shows a view in perspective of an inner part of the pivot hinge of FIG. 1.

It can be seen in FIG. 2 that the slidable reciprocating member 20 has one or more tension rods 23, 24 connecting the first end part 21 and the second end part 22 in a rigid manner.

The slidable reciprocating member 20 has sliding faces 70 that are in sliding engagement with the casing 2.

The casing 2 is provided with inner ribs 50 to slidably support the slidable reciprocating member 20. These inner ribs 50 may be provided on a lower part 2*b* of the casing 2 (e.g. shown in FIG. 2 and FIG. 7) and/or on an upper part 2*a* of the casing 2 (e.g. shown in FIG. 7).

The pivot hinge 1 further comprises a slidable guide member 40 that is movably mounted within the slidable reciprocating member 20, the slidable guide member 40 being coupled with the second cam follower 6, and the spring arrangement 30 being arranged between the slidable guide member 40 and the second end part 22.

The slidable guide member 40 may have sliding faces that may be in sliding engagement with the tension rods 23, 24, 25 (a potential fourth tension rod to form a symmetric arrangement is not shown in the figures).

In this embodiment the first cam follower 5 is retained on the first end part 21, and the second cam follower 6 is retained on the slidable guide member 40.

The slidable guide member 40 has sliding faces 41 that are in sliding engagement with the casing 2, shown here for lower part 2*b* thereof. The sliding faces 41 of the slidable guide member 40 are aligned with the sliding faces 50 of the slidable reciprocating member 20 such that these faces are supported by the same inner ribs of the casing.

In the embodiment of FIGS. 1-4B the slidable guide member 40 is elongate and has a bore in which the spring arrangement 30 is received. The spring arrangement 30 here comprises a coil spring, for example two concentric coil springs.

In the FIGS. 5 and 6 the cam 4 and cam followers 5, 6 are shown. The cam 4 has two pairs of recesses 7, 8, 9, 10, each pair being configured to simultaneously receive both of the cam followers 5, 6 on either side of the cam 4 so as to form holding positions for the door leaf, e.g. in opened and closed positions of the door leaf.

Figure 7:
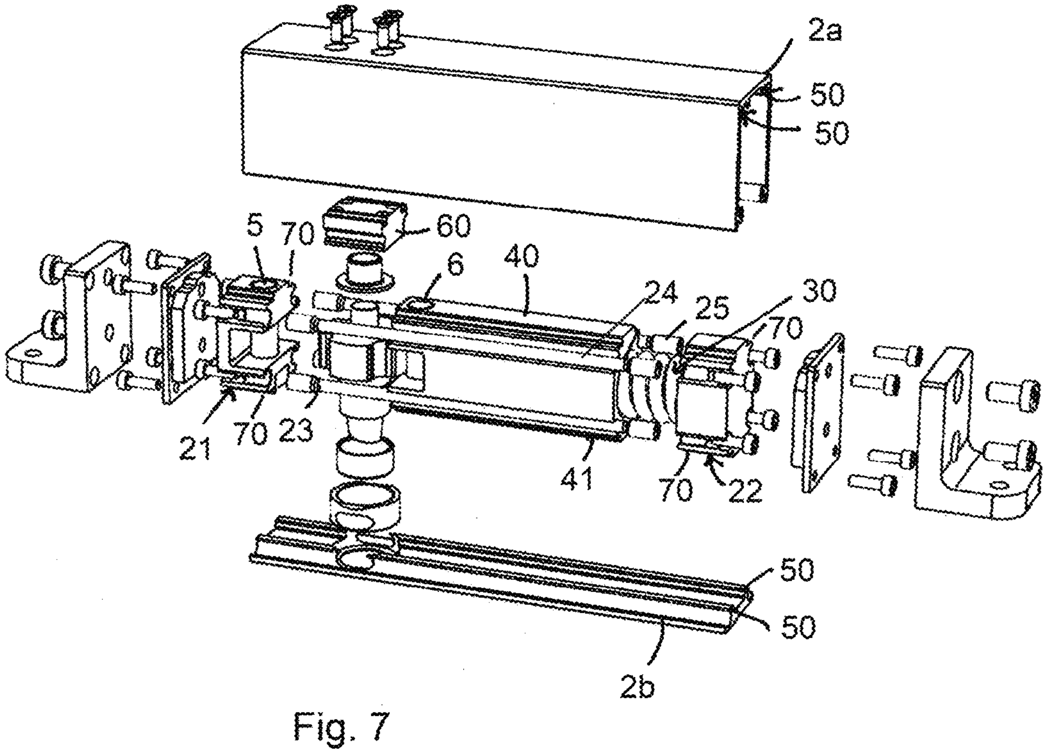
FIG. 7 schematically shows an exploded view of the pivot hinge of FIG. 1.

In FIG. 7 is schematically shown an exploded view of pivot hinge 1.

Figure 8:
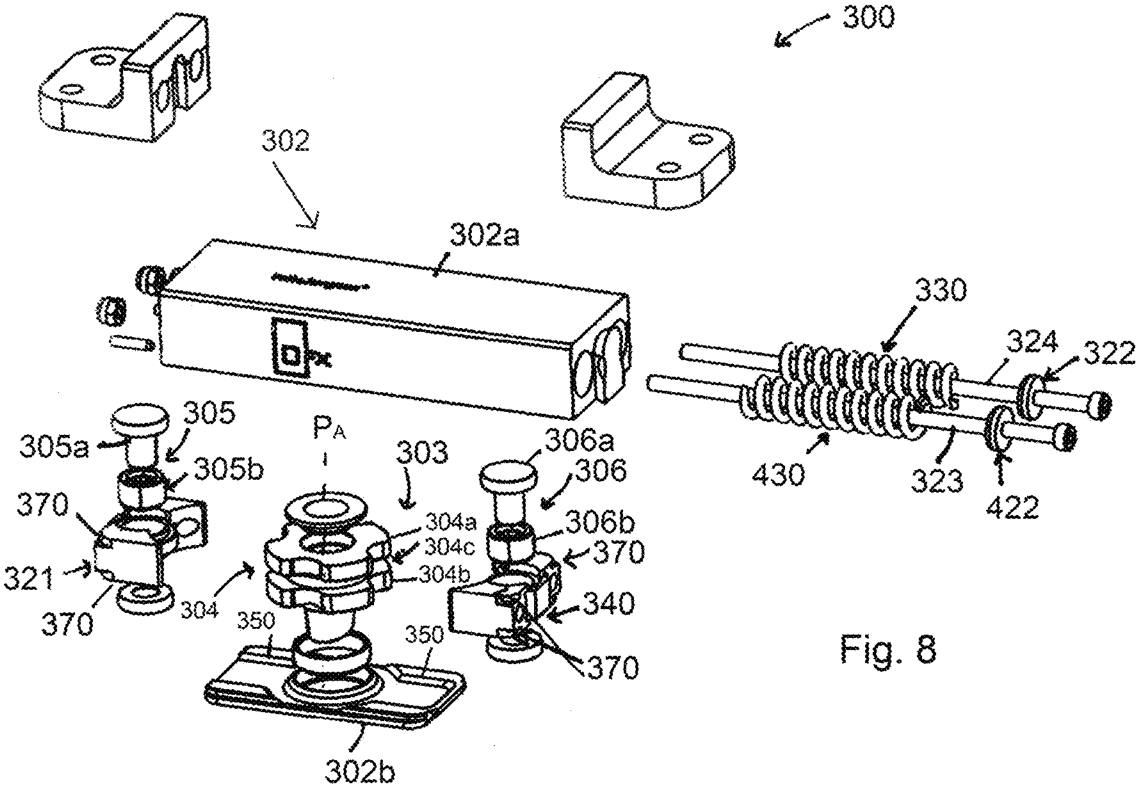
FIG. 8 schematically shows an exploded view of another pivot hinge according to the invention.
Figure 9:
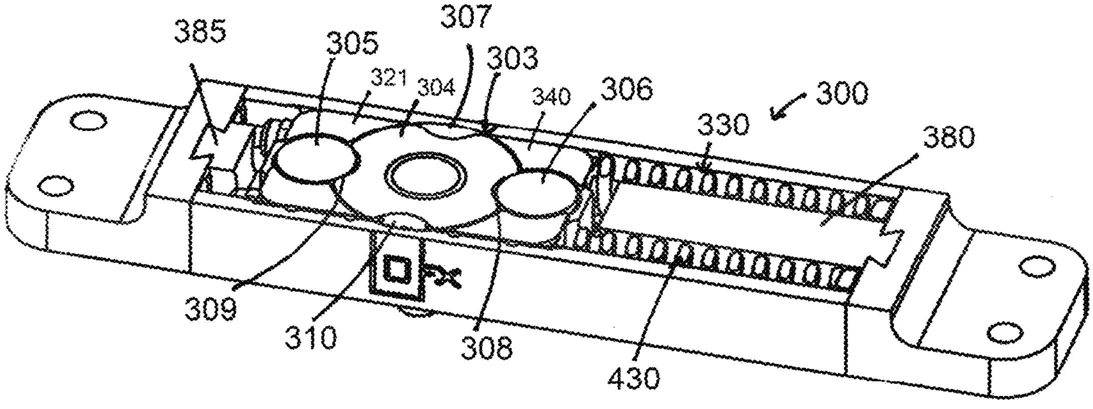
FIG. 9 schematically shows a view in perspective of a cross-section of the pivot hinge of FIG. 8.

In FIGS. 8-9 is shown another embodiment of a pivot hinge 300 according to the invention. The pivot hinge 300 has a pivot pin member 303 for pivotally connecting a pivotal door leaf with a structural element, the door leaf having an upper edge, lower edge, an inner side edge and an outer side edge, and the pivot pin member 303 defining a vertical pivot axis $P_A$ for the door leaf. The pivot hinge 300 comprises a casing 302 configured to be mounted to either the door leaf or the structural element, for example to the lower edge of the door leaf, the pivot pin member 303 being configured to be fixed to the other of the door leaf or the structural element.

The casing comprises an upper part 302*a* and a lower part 302*b*.

The pivot pin member 300 can be seen in FIGS. 8-9 to have a cam 304, the pivot hinge 300 comprising a first cam follower 305 on a first side of the pivot pin member 303 and a second cam follower 306 on a second side of the pivot pin member 303 opposite the first side. The cam followers 305, 306, are both movable in a radial direction relative to the cam 304.

The pivot hinge 300 is suitable to be mounted to the lower edge of the door leaf, e.g. in a corner region between the inner side edge and the lower edge of the pivotal door leaf. For example, the pivot hinge 300 may be mounted such that the hinge 300 extends along the lower edge of the pivotal door leaf and the first cam follower 305 is located near the inner side edge of the door leaf.

The pivot hinge 300 comprises spring arrangements 330, 430 adapted to urge a cam follower 305 or 306 against the cam 304. The spring arrangements 330, 430 here each comprise a coil spring. The coil springs are arranged side-by-side, separated by block 380. The cam 304 has recesses 308, 309 configured to receive one or both of the cam followers 305, 306 to form holding positions for the door leaf, e.g. in opened and/or closed positions of the door leaf, or positions therebetween.

The spring arrangements 330, 430 are arranged side-by-side within the casing 302.

The cam followers 305, 306 are provided with bearings 305*b* and 306*b* respectively.

The pivot hinge 300 further comprises a slidable reciprocating member being arranged within the casing 302 and being movably mounted therein. The slidable reciprocating member has a first end part 321 and a second end part 322 that are rigidly connected to one another. The slidable reciprocating member further has a third end part 422 that is rigidly connected to the first end part 321. As such the slidable reciprocating member has a predetermined, fixed length. The first end part 321 is coupled with the first cam follower 305.

The spring arrangement 330 is arranged between the second cam follower 306 and the second end part 322, and the spring arrangement 430 is arranged between the second cam follower 306 and the third end part 422, such that the spring arrangement 330 and/or spring arrangement 430 urge both cam followers 305, 306 against the cam 304.

The slidable reciprocating member has tension rod 324 for connecting the first end part 321 and the second end part 322, and the slidable reciprocating member has tension rod 323 for connecting the first end part 321 and the further end part 422.

The slidable reciprocating member has sliding faces, e.g. 370, that are in sliding engagement with the casing 302. The surfaces being in sliding engagement may be treated with a surface treatment, for example a friction reducing coating.

The casing 302 may be provided with inner ribs 350 to slidably support the slidable reciprocating member. These inner ribs 350 may be provided on a lower part 302*b* of the casing 302 (e.g. shown in FIG. 8) and/or on an upper part 302*a* of the casing 302. In the embodiment of FIGS. 8-9, the lower part 302*b* of the casing is provided with a recess, here demarcated between the ribs 350, so as to facilitate the sliding movement of the slidable reciprocating member. The slidable reciprocating member may be in sliding engagement with—i.e. direct contact with—the ribs 350 and/or the recess, or the slidable reciprocating member may slide in such a manner that there is no direct contact between the slidable reciprocating member and the ribs 350 and/or the recess.

The pivot hinge 300 further comprises a slidable guide member 340 that is movably mounted within the slidable reciprocating member, the slidable guide member 340 being coupled with the second cam follower 306, and the spring arrangements 330, 430 being arranged between the slidable guide member 340 and the respective end parts 322, 422.

In this embodiment the first cam follower 305 is retained on the first end part 321, and the second cam follower 306 is retained on the slidable guide member 340.

The slidable guide member 340 is elongate and has two bores in which the tension rods 323, 324 are received.

Tension rods 323, 324 are received in a recess 304*c* between upper part 304*a* and lower part 304*b* of the cam 304.

Block 380 is arranged at an end of the casing 302 on the same side of the pivot pin member 303 as first end part 321. Block 380 is arranged at the opposite end of the casing 302.

Figure 10:
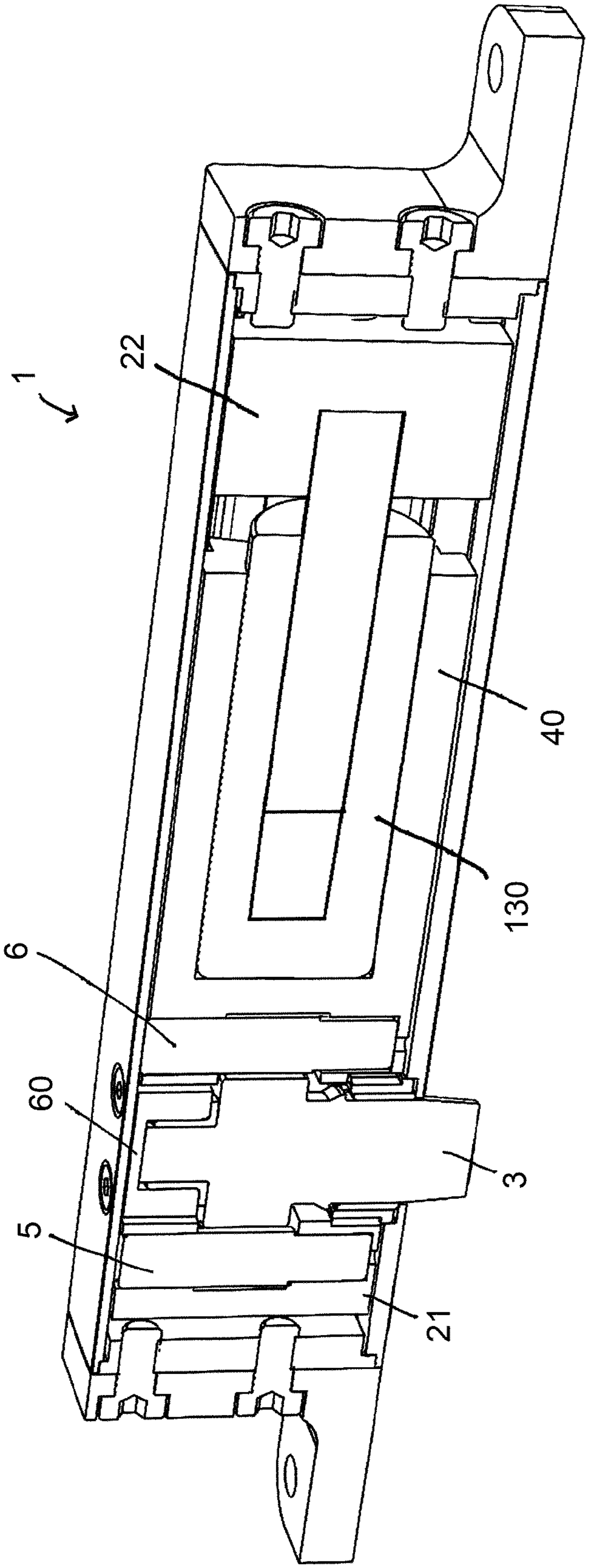
FIG. 10 schematically shows a cross-section another embodiment of the pivot hinge according to the invention.

FIG. 10 illustrates another embodiment of a pivot hinge according to the invention. Herein the spring arrangement is embodied as a gas spring member 130 having a cylinder body and a piston rod delimiting a chamber in the gas spring member that is filled with pressurized gas.

The invention claimed is:

1. A pivot hinge having a pivot pin member for pivotally connecting a pivotal door leaf with a structural element, the door leaf having an upper edge, lower edge, an inner side edge, and an outer side edge, and the pivot pin member defining a vertical pivot axis for the door leaf, wherein the pivot pin member has a cam, the pivot hinge comprising a first cam follower on a first side of the pivot pin member and a second cam follower on a second side of the pivot pin member opposite the first side, the first and second cam followers both being movable in a radial direction relative to the cam, wherein the pivot hinge further comprises a casing configured to be mounted to either the door leaf or the structural element, the pivot pin member being configured to be fixed to the other of the door leaf or the structural element, wherein a slidable reciprocating member is arranged within the casing and is movably mounted therein, wherein the slidable reciprocating member has a first end part at the first side of the pivot pin member and has a second end part at the second side of the pivot pin member, wherein the first and second end parts are rigidly connected to one another, wherein the first end part is coupled with the first cam follower, wherein the cam comprises at least one pair of recesses, each recess configured to receive a respective one of the first and second cam followers, wherein the pair of recesses is provided such that both first and second cam followers are simultaneously retained in the respective recess to form at least one holding position for the door leaf, wherein a spring arrangement is arranged between the second cam follower and the second end part and urges both first and second cam followers against the cam as the force exerted by the spring arrangement on the second end part is transferred by the rigid connection to the first end part of the slidable reciprocating member, the first and second cam followers being urged into the respective recess by the spring arrangement arranged between the second cam follower and the second end part to provide a holding moment to retain the door leaf in said holding position for the door leaf.

2. The pivot hinge according to claim 1, wherein the pivot hinge further comprises a slidable guide member which is movably mounted within the slidable reciprocating member, the slidable guide member being coupled with the second cam follower, and the spring arrangement being arranged between the slidable guide member and the second end part.

3. The pivot hinge according to claim 2, wherein the slidable guide member is elongate and has a bore in which the spring arrangement is received.

4. The pivot hinge according to claim 2, wherein the slidable reciprocating member has sliding faces that are in sliding engagement with the casing.

5. The pivot hinge according to claim 4, wherein the first end part and the second end part are rigidly connected by means of tension rods, wherein the sliding faces of the slidable reciprocating member are in sliding engagement with the tension rods.

6. The pivot hinge according to claim 1, wherein the spring arrangement comprises a coil spring.

7. The pivot hinge according to claim 6, wherein the coil spring is received in the bore of the slidable guide member.

8. The pivot hinge according to claim 1, wherein the cam followers are cam wheels.

9. A pivotal door leaf provided with a pivot hinge according to claim 1.

10. The pivotal door leaf according to claim 9, wherein the pivot hinge is mounted to the lower edge of the door leaf.

11. The pivotal door leaf according to claim 10, wherein the pivot hinge is mounted such that the pivot hinge extends along the lower edge of the pivotal door leaf and the first cam follower is located near the inner side edge of the door leaf.

12. The pivot hinge according to claim 1, wherein the cam is a circular cam, wherein the recesses of the at least one pair of recesses are provided at diametrically opposing sides of the cam.

13. The pivot hinge according to claim 12, wherein the cam comprises two pair of recesses wherein the recesses are evenly spaced along the cam at right angles from each other.

14. The pivot hinge according to claim 1, wherein the first end part and the second end part are rigidly connected by means of tension rods.

15. The pivot hinge according to claim 1, wherein the casing is provided with inner ribs to slidably support the slidable reciprocating member.

16. The pivot hinge according to claim 15, wherein the inner ribs have a length and the spring arrangement has a length, wherein the length of the inner ribs is larger than the length of the spring arrangement.

17. The pivot hinge according to claim 1, wherein the spring arrangement has a single spring member.

18. The pivot hinge according to claim 1, wherein the holding moment is only generated by the force which is exerted by the spring arrangement which is arranged between the second cam follower and the second end part.

19. The pivot hinge according to claim 1, wherein the cam is a circular cam with two pairs of recesses, wherein the recesses are evenly spaced along the cam, wherein the first end part and the second end part are rigidly connected by means of four tension rods, wherein the casing is provided with inner ribs to slidably support the slidable reciprocating member, and wherein the pivot hinge further comprises a slidable guide member which is movably mounted within the slidable reciprocating member, the slidable guide member being coupled with the second cam follower, wherein the spring arrangement is arranged between the slidable guide member and the second end part.

20. The pivot hinge according to claim 1, wherein the slidable reciprocating member further has a third end part that is rigidly connected to the first end part, and a second spring arrangement is arranged between the second cam follower and the third end part, such that the spring arrangements urges both cam followers against the cam.

* * * * *